US009923431B2

(12) United States Patent
Mountain et al.

(10) Patent No.: US 9,923,431 B2
(45) Date of Patent: Mar. 20, 2018

(54) VARIABLE SPEED DRIVE ARRANGEMENT

(71) Applicant: ROLLS-ROYCE plc, London (GB)

(72) Inventors: Stephen J Mountain, Derby (GB);
Chandana Jayampathi Gajanayake,
Singapore (SG); Meng Yeong Lee,
Singapore (SG)

(73) Assignee: ROLLS-ROYCE plc, London (GB)

( * ) Notice: Subject to any disclaimer, the term of this patent is extended or adjusted under 35 U.S.C. 154(b) by 357 days.

(21) Appl. No.: 14/942,064

(22) Filed: Nov. 16, 2015

(65) Prior Publication Data
US 2016/0172935 A1 Jun. 16, 2016

(30) Foreign Application Priority Data

Dec. 15, 2014 (GB) .................................. 1422233.5

(51) Int. Cl.
*H02P 5/753* (2006.01)
*F16H 3/72* (2006.01)
(Continued)

(52) U.S. Cl.
CPC .............. *H02K 7/20* (2013.01); *F16H 3/724* (2013.01); *H02K 7/116* (2013.01);
(Continued)

(58) Field of Classification Search
USPC ................................................ 318/9–15, 139
See application file for complete search history.

(56) References Cited

U.S. PATENT DOCUMENTS 4,098,144 A * 7/1978 Besel ..................... B60K 6/105
180/165
4,900,231 A * 2/1990 Kennedy ................ B64D 41/00
417/16
(Continued)

FOREIGN PATENT DOCUMENTS

EP         2535582 A1    12/2012
WO    2009/054727 A2     4/2009
(Continued)

OTHER PUBLICATIONS

Jun. 8, 2015 Search Report issued in British Patent Application No. 1422233.5.
(Continued)

*Primary Examiner* — Bentsu Ro
(74) *Attorney, Agent, or Firm* — Oliff PLC

(57) ABSTRACT

A variable speed drive arrangement including: a load; a gearbox to supply mechanical drive to the load; a converter electrically coupled with a power grid. Also a primary electrical machine to supply mechanical power to the gearbox and to receive electrical power; and a secondary electrical machine mechanically coupled to the gearbox and electrically coupled to the converter. An electrical circuit breaker to selectively electrically couple the primary electrical machine to the secondary electrical machine or to the power grid; wherein the secondary electrical machine is adapted to supply or extract mechanical energy from the gearbox and to receive or deliver electrical energy to the converter. Also a control method for the arrangement including a starting mode and a running mode.

20 Claims, 13 Drawing Sheets

FIG. 1

(51) Int. Cl.
*H02K 7/20* (2006.01)
*H02K 11/00* (2016.01)
*H02K 7/116* (2006.01)
*H02P 27/04* (2016.01)
*H02P 5/747* (2006.01)

(52) U.S. Cl.
CPC .......... *H02K 11/0073* (2013.01); *H02P 5/747* (2013.01); *H02P 27/04* (2013.01)

(56) References Cited

U.S. PATENT DOCUMENTS

| | | | |
|---|---|---|---|
| 7,494,438 B2* | 2/2009 | Kimura | F16H 3/724 |
| | | | 475/150 |
| 7,757,797 B2* | 7/2010 | Dobereiner | B60K 6/48 |
| | | | 180/65.31 |
| 2001/0019210 A1* | 9/2001 | Fukasaku | B60K 6/26 |
| | | | 290/40 C |
| 2016/0084228 A1 | 3/2016 | Waldner et al. | |

FOREIGN PATENT DOCUMENTS

| | | |
|---|---|---|
| WO | 2014/169302 A1 | 10/2014 |
| WO | 2016/059115 A1 | 4/2016 |
| WO | 2016/091958 A1 | 6/2016 |

OTHER PUBLICATIONS

Jun. 23, 2016 Search Report issued in European Patent Application No. 15 19 4691.

* cited by examiner

VARIABLE SPEED DRIVE ARRANGEMENT

The present invention relates to a variable speed drive arrangement, in particular for driving a variable speed compressor or other variable speed load. In particular it relates to an arrangement having two electrical machines and a mechanical gearbox.

A gas compressor may be driven at variable speed via a gearbox and/or variable frequency drive in combination with an electric motor. For example, a variable frequency drive may receive electrical input at constant or variable frequency and may output a defined variable frequency to an electric motor which converts that frequency to mechanical shaft speed at a defined ratio. The shaft is coupled to the gas compressor which is thus driven at the shaft speed.

One disadvantage of this arrangement is that the variable frequency drive must be rated at the maximum compressor power. Such devices are both expensive and physically large.

It is known to restrict the operating range of compressors or other loads to higher speeds where the work done by the load is greater. However, it is necessary to accelerate such arrangements from stationary up to the operating speed range.

It is known to soft start a constant speed electric motor by connecting a small variable frequency drive for start-up, synchronising the motor to the power supply and then disconnecting the variable frequency drive. One disadvantage of this arrangement is that the compressor can only be operated at constant speed. A further disadvantage is that the compressor must be unloaded so that the variable frequency drive need not be rated of the full load power.

The present invention provides a variable speed drive arrangement that seeks to address the aforementioned problems.

Accordingly the present invention provides a variable speed drive arrangement comprising:
a load;
a gearbox to supply mechanical drive to the load;
a converter electrically coupled with a power grid;
a primary electrical machine to supply mechanical power to the gearbox and to receive electrical power;
a secondary electrical machine mechanically coupled to the gearbox and electrically coupled to the converter; and
a first electrical circuit breaker to selectively electrically couple the primary electrical machine to the secondary electrical machine or to the power grid;
wherein the secondary electrical machine is adapted to supply or extract mechanical power from the gearbox and to receive or deliver electrical power to the converter.

Advantageously the variable speed drive arrangement requires a smaller converter than known arrangements. Advantageously there is one electrical machine which operates at a fixed speed, once accelerated from stationary, and one electrical machine which operates at variable speed, between maximum forward and maximum reverse, in order to effect variable speed drive control.

The load may be a compressor.

The primary electrical machine may be a fixed speed machine. Alternatively the primary electrical machine may be a variable speed machine. The primary machine may be a synchronous machine or an induction machine.

The secondary electrical machine may be a variable speed machine. The secondary machine may be a synchronous machine or an induction machine.

The gearbox may be an epicyclic gearbox. Advantageously such a gearbox comprises three ports which may be configured as inputs or outputs. There may be one or two inputs which may be driven at different speeds. There may be one or two outputs which may provide drive at different speeds.

There may be a second circuit breaker between the primary electrical machine and the power grid. The second circuit breaker may act to synchronise the voltage and/or frequency of the converter and electrical machines.

The arrangement may further comprise a controller. The controller may be arranged to schedule output frequency from the converter in the range zero Hertz to maximum frequency. The maximum frequency may be equal to the grid frequency. The grid frequency may be 50 Hertz or 60 Hertz. The power grid may be a local grid or a national grid. A local grid may comprise any combination of: one or more electrical machines; one or more gas turbine engines; one or more other power sources.

The controller may be arranged to schedule switching of the first electrical circuit breaker. The controller may be arranged to schedule switching of the second electrical circuit breaker. The controller may be arranged to switch phase connections to the secondary electrical machine to effect control of the direction of rotation of the secondary electrical machine.

The secondary electrical machine may be smaller than the primary electrical machine. The secondary electrical machine may be one quarter of the size of the primary electrical machine. The size may be physical and/or in terms of the power capacity.

The converter may be sized for up to 20% of the output power demand of the load. Advantageously such a converter is much smaller and cheaper than a converter sized for 100% of the load power demand. Advantageously such a converter is also more reliable.

The arrangement may further comprise an additional gear between the secondary electrical machine and the gearbox. The additional gear may step up or step down the speed between the secondary electrical machine and the gearbox.

The present invention also provides a control method for the arrangement described, the method comprising:
in a starting mode, increasing the output frequency of the converter up to a maximum to accelerate the primary electrical machine up to its fixed speed and to accelerate the secondary electrical machine up to its maximum speed in the opposite rotational sense to the primary electrical machine; and
in a running mode, controlling the speed of the secondary electrical machine between maximum forward speed and maximum reverse speed to module the mechanical output of the gearbox and thus the load output speed.

Advantageously the control method may return to the starting mode from the running mode before shutting down the variable speed drive arrangement. Thus the control method may further comprise: in a shut-down mode, closing the first electrical circuit breaker and coupling the converter to the secondary electrical machine such that it will accelerate in the opposite rotational sense to the primary electrical machine.

The control method may also comprise: in the shut-down mode, opening the second electrical circuit breaker to break the couple between the primary electrical machine and the power grid.

The shut-down mode may occur after the running mode.

The control method may further comprise: in a transition mode, switching the first electrical circuit breaker to break the couple between the primary and secondary electrical machines and to make the couple between the primary electrical machine and the power grid. The transition mode may occur between the starting mode and the running mode. Advantageously the transition mode ensures synchronisation of voltage and/or frequency between the electrical machines and the converter and/or power grid between the starting and running modes.

The control method may further comprise: in a second transition mode, switching the first electrical circuit breaker to make the couple between the primary and secondary electrical machines and to break the couple between the primary electrical machine and the power grid. The transition mode may occur between the running mode and the starting mode or between the running mode and the shut-down mode. Advantageously the second transition mode ensures synchronisation of voltage and/or frequency between the electrical machines and the converter and/or power grid between the running and starting modes or between the running and shut-down modes.

In the starting mode the secondary electrical machine may be directly coupled to the primary electrical machine.

In the running mode the secondary electrical machine may be coupled to the power grid. In the running mode the secondary electrical machine may be run forwards or backwards to modulate the mechanical output of the gearbox.

Any combination of the optional features is encompassed within the scope of the invention except where mutually exclusive.

The present invention will be more fully described by way of example with reference to the accompanying drawings, in which.

Figure 1:
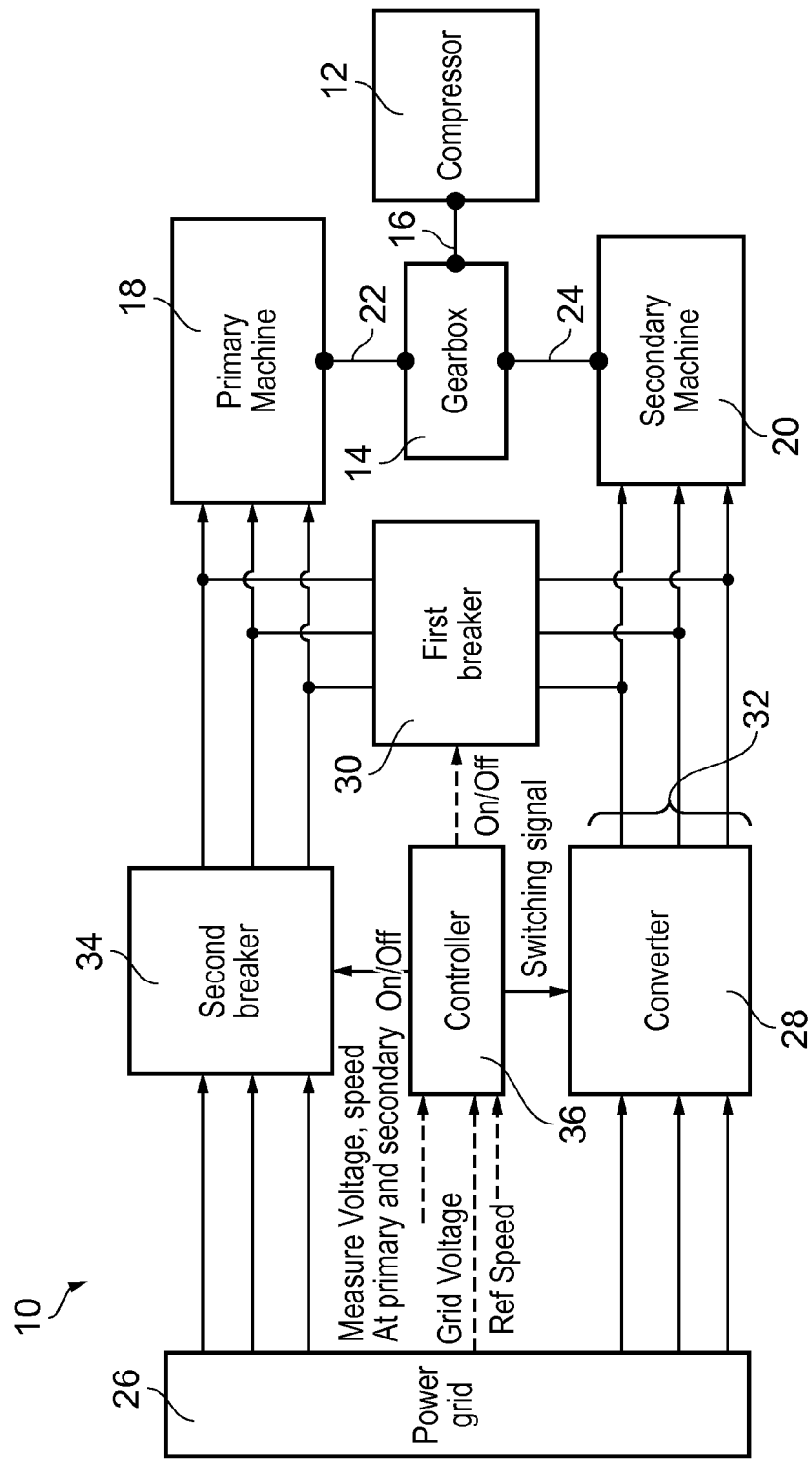
FIG. 1 is a schematic drawing of a compressor drive arrangement according to the present invention.

FIG. 1 shows a variable speed drive arrangement 10 according to the present invention. A compressor 12 is to be driven by the arrangement 10. The compressor 12 may be a gas compressor for compressing natural gas. It is required that the compressor 12 be driven at variable speeds to control capacity effectively.

The compressor 12 is mechanically coupled to a gearbox 14 by a mechanical drive shaft 16. The gearbox 14 will be described in more detail below with reference to FIG. 5.

The variable speed drive arrangement 10 comprises a primary electrical machine 18 and a secondary electrical machine 20. Preferably the primary electrical machine 18 is a fixed speed machine whilst the secondary electrical machine 20 is a variable speed machine. The primary electrical machine 18 is mechanically coupled to the gearbox 14 by a primary mechanical shaft 22. Similarly, the secondary electrical machine 20 is mechanically coupled to the gearbox 14 by a secondary mechanical shaft 24.

A power grid 26 supplies electrical power at constant frequency alternating current. The power grid 26 may be a national grid or a local grid. Where the power grid 26 is a national grid it may supply electrical power at a frequency of 50 Hertz or 60 Hertz. Where the power grid 26 is a local grid, it may comprise one or more electrical machines, gas turbine engines or other power sources. A local grid may supply electrical power at a frequency in the range of 50 to 60 Hertz.

The secondary electrical machine 20 is electrically coupled to the power grid 26. A converter 28 is provided between the secondary electrical machine 20 and the power grid 26. The converter 28 is configured to vary the frequency provided to the secondary electrical machine 20 between zero Hertz and a maximum frequency. The maximum frequency is the maximum that the secondary electrical machine 20 is designed to receive. Advantageously the maximum frequency output from the converter 28 may be equal to the constant frequency supplied by the power grid 26, for example 50 Hertz. An electrical couple 32, for example wires carrying three-phase electricity, joins the converter 28 and the secondary electrical machine 20.

The primary electrical machine 18 is electrically coupled to the power grid 26. A first electrical circuit breaker 30 is provided between the primary electrical machine 18 and the electrical couple 32. The first electrical circuit breaker 30 electrically couples the primary electrical machine 18 to the secondary electrical machine 20 when it is closed, that is when electricity can freely flow through it. The first electrical circuit breaker 30 prevents current flow from the secondary electrical machine 20 to the primary electrical machine 18 when it is open. Instead, the primary electrical machine 18 receives electrical power from the power grid 26 when the first electrical circuit breaker 30 is open. Thus the first electrical circuit breaker 30 is arranged to selectively electrically couple the primary electrical machine 18 to the secondary electrical machine 20 or to the power grid 26. The first electrical circuit breaker 30 makes or breaks the couple between the converter 28 and secondary electrical machine 20 on one side and the primary electrical machine 18 on the other side. Similarly, the first electrical circuit breaker 30 effectively makes or breaks the couple between the primary electrical machine 18 and the power grid 26.

A second electrical circuit breaker 34 is provided between the primary electrical machine 18 and the power grid 26 to permit frequency and/or voltage synchronisation as will be described below. Thus the second electrical circuit breaker 34 makes or breaks the couple between the primary electrical machine 18 and the power grid 26. Once the voltage and frequency of the power grid 26 and the converter 28 are synchronised the second electrical circuit breaker 34 is closed, so the couple is made between the primary electrical machine 18 and the power grid 26. There may be situations in which both the first electrical circuit breaker 30 and the second electrical circuit breaker 34 are closed so that the primary electrical machine 18 is coupled both to the power grid 26 and to the converter 28 and secondary electrical machine 20. Advantageously there is no transient condition produced when the primary electrical machine 18 is connected to the power grid 26, so long as the frequency and voltage are synchronised.

A controller 36 is optionally provided which receives parameter values from the components of the variable speed drive arrangement 10 and supplies control signals to the converter 28, the first electrical circuit breaker 30 and the second electrical circuit breaker 34.

As illustrated, all the electrical connections to electrically couple components together are three-phase, shown by three parallel arrows. However, in other applications single-phase electricity may be sufficient, or more than three phases may be preferable. The mechanical shafts 16, 22, 24 may directly couple the components or may include one or more additional gears in order to apply a fixed speed ratio. For example, a gear may be included in the secondary mechanical shaft 24 to change the speed ratio between the secondary electrical machine 20 and the gearbox 14.

Optionally the controller 36 shown in FIG. 1 is arranged to control components of the variable speed drive arrangement 10. In a starting mode the controller 36 is arranged to switch the first electrical circuit breaker 30 to closed and the second electrical circuit breaker 34 to open. The controller 36 is also arranged to schedule the output frequency of the converter 28 to rise from zero Hertz to its maximum frequency over the desired duration of the starting mode. The starting mode duration may be a few seconds or longer, sometimes much longer, and is dependent on the specific application, customisable parameters of the starting mode and the operating mode of the compressor 12. The controller 36 may be implemented as software or hardware. When implemented as software the controller 36 may generate control signals that are passed to each of the first electrical circuit breaker 30, second electrical circuit breaker 34 and converter 28. Periodic or continuous control signals may be generated by the controller 36 and passed to the converter 28 to govern each required increase in output frequency.

The controller 36 may also be arranged to switch the phase of the connections between the converter 28 and the secondary electrical machine 20 to control the direction of rotation of the rotor of the secondary electrical machine 20. The controller 36 may generate a control signal to switch the phase connections and passes it to the converter 28 and/or the secondary electrical machine 20 to implement. The phase connections at one end of the electrical couple 32 may be physically connected and the phase connections at the other end of the electrical couple 32 may be connected electronically or by software. The software can alter the phase sequence of the reference voltage to change the phase connections. For example, there may be physical phase connections to the stator of the secondary electrical machine 20 and electronic phase connections to the converter 28. Advantageously the controller 36 can schedule the control signal to switch the phase connections with the scheduling of the output frequency of the converter 28. This will ensure that the change in phase connection to reverse the direction of rotation of the rotor of the secondary electrical machine 20 is only instructed when the output frequency of the converter 28 has been reduced to zero so that the secondary electrical machine 20 is not rotating. Thus the secondary electrical machine 20 is protected from abrupt reversal of the direction of rotation. Advantageously the current is low at this operating point and therefore the converter 28 size is minimal.

Figure 2:
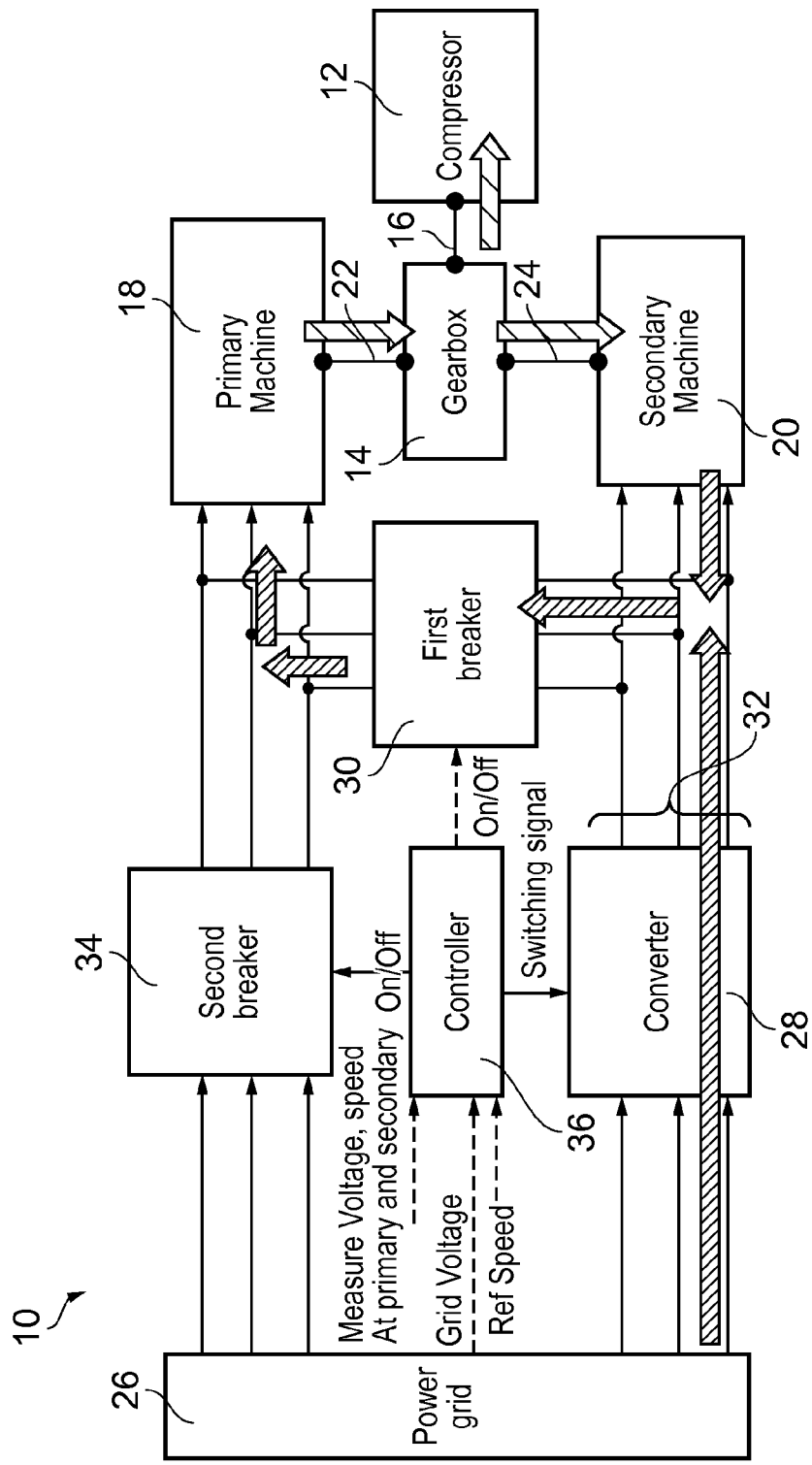
FIG. 2 is similar to FIG. 1 and shows operation in a starting mode.

The variable speed drive arrangement 10 shown in FIG. 1 operates differently in two modes: a starting mode and a running mode. First the starting mode is described with reference to FIG. 2.

To start the variable speed drive arrangement 10 it is necessary to accelerate both the primary and the secondary electrical machines 18, 20 from stationary to their maximum speeds. In the starting mode the first electrical circuit breaker 30 is closed so that electricity can flow through it. The first electrical circuit breaker 30 is closed so that electrical current can flow through it between the electrical couple 32 and the primary electrical machine 18. Flow of electrical power is shown by arrows with vertical stripes in FIG. 2. The second electrical circuit breaker 34 is open so that no electricity can flow through it.

The converter 28 is initially arranged to output alternating voltage with a frequency at or close to zero Hertz. The electrical couple 32 between the converter 28 and the secondary electrical machine 20, particularly the stator thereof, is configured so that the rotor of the secondary electrical machine 20 is rotated in the opposite rotational sense to the rotor of the primary electrical machine 18. Thus the rotor of the primary electrical machine 18 is caused to rotate in the 'forward' direction and the rotor of the secondary electrical machine 20 is caused to rotate in the 'reverse' direction. The forward direction is defined as the direction which causes the unidirectional compressor 12 to rotate in its specified direction. The forward direction of the primary electrical machine 18 is therefore in the same rotational sense as the rotational direction of the compressor 12 unless the gearing between the primary electrical machine 18 and the compressor 12 requires otherwise.

During the starting mode the converter 28 increases the output frequency from zero Hertz up to its maximum frequency, for example 50 Hz. This causes the primary electrical machine 18 to accelerate to its maximum speed in the forward direction, through the electrical couple provided by the first electrical circuit breaker 30. Simultaneously the increase in output frequency from the converter 28 causes the secondary electrical machine 20 to accelerate to its maximum speed in the reverse direction, through the electrical couple 32 and the phase connections between the converter 28 and the stator of the secondary electrical machine 20.

The primary electrical machine 18 acts as a motor during the starting mode. That is it receives electrical power and converts it to mechanical power which it supplies to the gearbox 14 through the primary mechanical shaft 22. Conversely the secondary electrical machine 20 acts as a generator in the starting mode. That is it receives mechanical power from the gearbox 14 through the secondary mechanical shaft 24 and converts it to electrical power which it supplies into the electrical couple 32. Thus the secondary electrical machine 20 generates electrical power, due to the braking torque (which equates to power) generated in the gearbox 14 being in the opposite direction to the rotational speed, which it supplies to the primary electrical machine 18 through the first electrical circuit breaker 30. The flow of mechanical power is shown by arrows with horizontal stripes.

The variable speed drive arrangement 10 remains in the starting mode until both the primary electrical machine 18 and the secondary electrical machine 20 have been accelerated to their maximum speed and the output frequency of the converter 28 is at its maximum. At this point the compressor 12 may be driven at its minimum operating power. The gearbox 14 supplies mechanical power to the compressor 12 via the mechanical drive shaft 16 and the secondary electrical machine 20 draws mechanical power from the gearbox 14 via the secondary mechanical shaft 24. Thus the primary electrical machine 18 generates more mechanical power than the compressor 12 demands but the excess is drawn by the secondary electrical machine 20.

Figure 3:
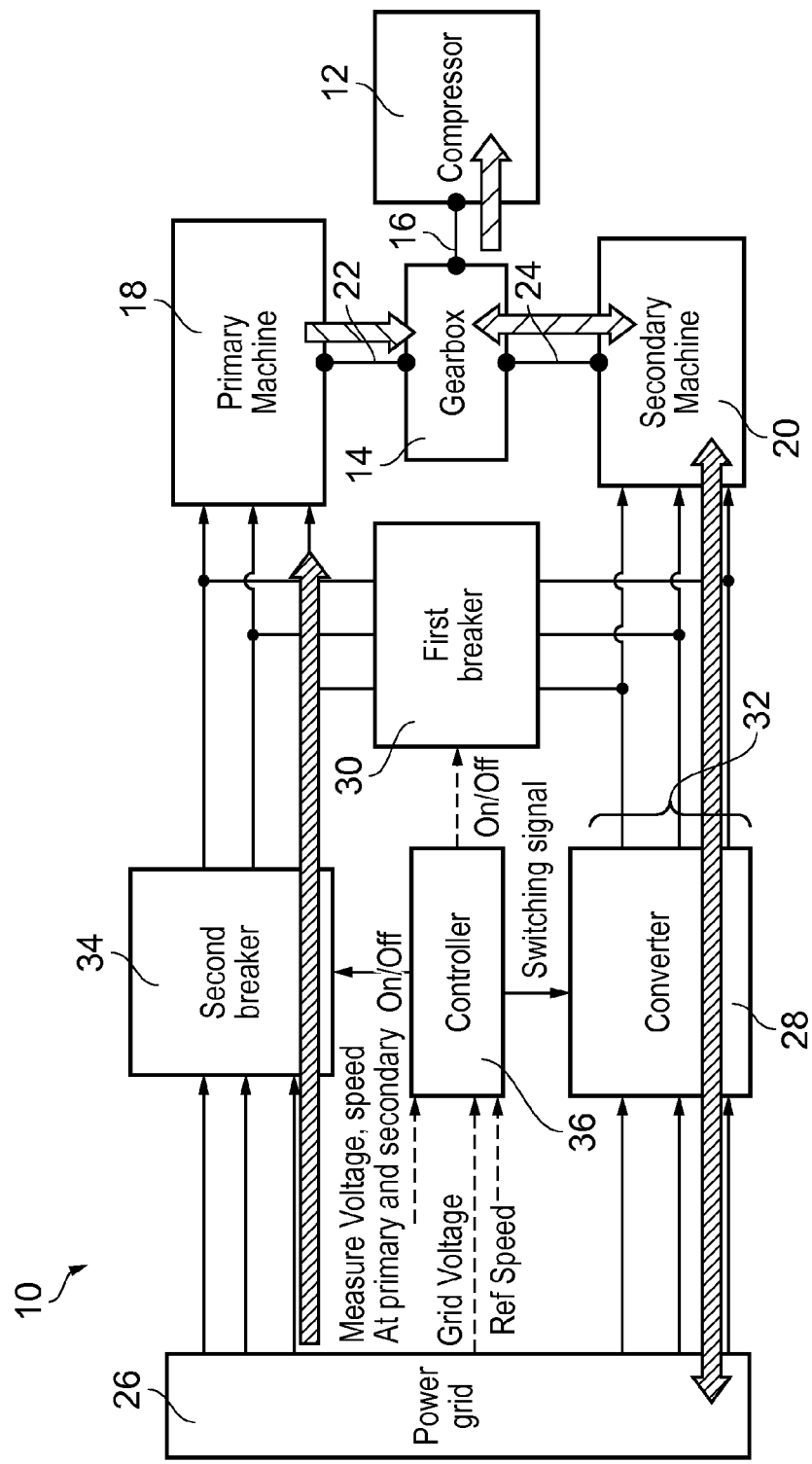
FIG. 3 is similar to FIG. 1 and shows operation in a running mode.

The variable speed drive arrangement 10 now transitions from the starting mode into the running mode. The running mode is described with reference to FIG. 3. A precursor for the transition from starting mode to running mode is that the voltage and frequency of the converter 28 and power grid 26 are synchronised, otherwise a large current flows. Large current would either damage the converter 28 and first and second electrical circuit breakers 30 or would require them to be rated for higher currents and therefore be larger. Synchronisation is controlled by the controller 36, embodiments of which are described below with respect to FIG. 9 to FIG. 14. The transition mode is described below.

In the running mode the first electrical circuit breaker 30 is opened to prevent the flow of electrical power from the electrical couple 32 to the primary electrical machine 18. The second electrical circuit breaker 34 is closed to permit electrical power to flow from the power grid 26 to the primary electrical machine 18. Since the maximum frequency of the converter 28 is preferably the same frequency as the power grid 26, the primary electrical machine 18 experiences no change in frequency when its electrical power source transitions. The primary electrical machine 18 continues to act as a motor: it receives electrical power, from the power grid 26, and converts it to mechanical power which it supplies to the gearbox 14 and thence to the compressor 12 at constant speed via the primary mechanical shaft 22. Thus the primary electrical machine 18 supplies the majority of the mechanical power, for example up to 80% of it, to drive the compressor 12.

In the running mode the first electrical circuit breaker 30 is open and therefore the electrical connection between the secondary electrical machine 20 and the primary electrical machine 18 is broken. The secondary electrical machine 20 is therefore only electrically coupled, via couple 32, to the converter 28. The variable speed of the secondary electrical machine 20 is thus controlled by the output frequency of the converter 28. The secondary electrical machine 20 may be operated as a generator, where the direction of rotation is the reverse direction as in the starting mode, or as a motor, where the direction of rotation is reversed so that it is forward (in the same sense as the primary electrical machine 18 and the compressor 12). When the variable speed drive arrangement 10 has first transitioned from the starting mode to the running mode the secondary electrical machine 20 acts as a generator. As demand from the compressor 12 increases, the converter 28 reduces the output frequency to cause the secondary electrical machine 20 to slow down. Consequently the secondary electrical machine 20 draws less mechanical power from the gearbox 14 which enables more of the mechanical power generated by the primary electrical machine 18 to be supplied to the compressor 12 via the gearbox 14. The mechanical power that the secondary electrical machine 20 does draw from the gearbox 14 is converted into electrical power which is supplied, via the converter 28, to the power grid 26. Thus the power grid 26 acts as a source of electrical power for the primary electrical machine 18 but as a dump of electrical power for the secondary electrical machine 20.

As demand from the compressor 12 continues to increase, the output frequency of the converter 28 may be reduced to zero Hertz which causes the secondary electrical machine 20 to stop rotating. At this operating point the secondary electrical machine 20 does not draw any mechanical power from the gearbox 14. All of the compressor power demand is met by the mechanical power generated by the primary electrical machine 18.

If demand from the compressor 12 increases still further the sequence of the reference voltage is altered to change the phase connections between the converter 28 and the stator of the secondary electrical machine 20 and thereby reverse the direction of rotation of the rotor of the secondary electrical machine 20. Then the output frequency of the converter 28 is increased. This causes the rotor of the secondary electrical machine 20 to accelerate in the forward direction. Consequently the secondary electrical machine 20 draws electrical power from the power grid 26, via the converter 28, and converts it to mechanical power. It supplies the mechanical power to the gearbox 14, via the secondary mechanical shaft 24, to augment the mechanical power supplied by the primary electrical machine 18. If the output frequency of the converter 28 is increased to its maximum the secondary electrical machine 20 rotates at its maximum speed in the forward direction. Advantageously this is the same speed as the primary electrical machine 18 so that both can be implemented by commercially available electrical machines designed for operation at 50 Hertz or 60 Hertz. At this point the compressor 12 is at its maximum operating power. The primary electrical machine 18 supplies the majority of the mechanical power for the compressor 12, for example 80% of it, whilst the secondary electrical machine 20 supplies the remainder of the required mechanical power for the compressor 12, for example 20%.

In the running mode of the variable speed drive arrangement 10 the speed of the secondary electrical machine 20 is controlled to modulate between maximum forward and maximum reverse speed.

It is advantageous for the speed range of the compressor 12 to be small, for example excluding low speeds, so that the secondary electrical machine 20 and the converter 28 are consequently physically small and low powered.

Figure 4:
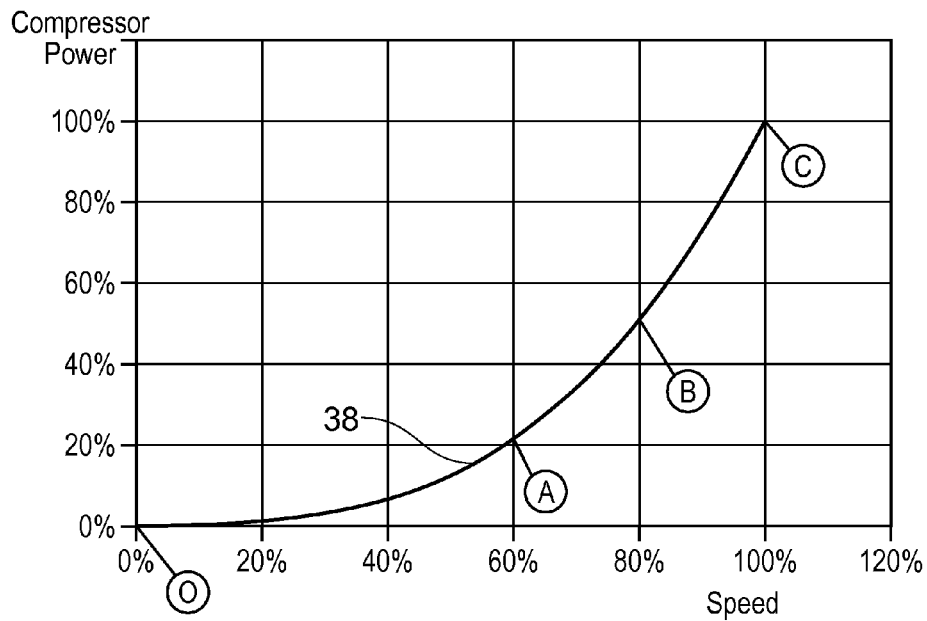
FIG. 4 is a graph showing compressor power as a function of speed.

FIG. 4 shows a graph of the power of the compressor 12 plotted against its speed, which is the same as the speed of the mechanical drive shaft 16. Power is proportional to speed cubed as shown by line 38. The variable speed drive arrangement 10 is in the starting mode from the origin O of line 38 up to operating point A. At operating point A the converter 28 outputs its maximum frequency so that the primary electrical machine 18 rotates at its fixed speed and the secondary electrical machine 20 rotates at its maximum speed in the reverse direction.

The portion of line 38 between operating point A and operating point C represents the running mode. Operating point C is the maximum power demand of the compressor 12 and operating point A is the minimum power demand for normal running of the compressor 12. At operating point C the secondary electrical machine 20 rotates at its maximum speed in the forward direction. Operating point B corresponds to the point at which the secondary electrical machine 20 is stationary and the primary electrical machine 18 supplies all its mechanical power to the compressor 12 via the gearbox 14.

In an exemplary variable speed drive arrangement 10 according to the present invention the compressor 12 is rated for 30 MW maximum power demand. The primary electrical machine 18 and the secondary electrical machine 20 are each designed to operate at 3000 rpm. The primary electrical machine 18 is a fixed speed synchronous machine rated for 24 MW whilst the secondary electrical machine 20 is a variable speed synchronous machine rated for 6 MW. Thus the secondary electrical machine 20 is smaller than the primary electrical machine 18. In this exemplary arrangement the secondary electrical machine 20 is a quarter of the size of the primary electrical machine 18.

Operating point A is arranged to be at 60% compressor speed. This equates to approximately 20% of compressor power, since $(0.6)^3 \approx 0.2$, and so advantageously the converter 28 needs to be sized for only 20% of compressor power demand (6 MW) and not for the full power demand of the compressor 12. Conveniently this means that the converter 28 is also appropriately sized for the secondary electrical machine 20 which it controls during the running mode of the variable speed drive arrangement 10. Thus the converter 28 does not need to be oversized for either its starting mode function or its running mode function because the balance between the reactive powers from the primary and secondary electrical machines 18, 20 is approximately zero.

At operating point B the compressor 12 receives mechanical power output only from the primary electrical machine 18 and the secondary electrical machine 20 is stationary and so does not extract or supply mechanical power to the gearbox 14 and thence to the compressor 12. At operating point C the compressor 12 operates at its maximum power, 30 MW in the example, which comprises 80% (24 MW) from the primary electrical machine 18 and 20% (6 MW) from the secondary electrical machine 20 which is operated at full speed in the forward direction.

The transition from the starting mode into the running mode is managed in a transition mode. In the transition mode the voltage and frequency of the converter 28 is synchronised with the voltage and frequency of the power grid 26. The synchronisation is controlled by the controller 36 as described further below. The second electrical circuit breaker 34 is only closed once the frequencies are synchronised. The first electrical circuit breaker 30 is then opened to prevent current flow from the electrical couple 32 to the primary electrical machine 18. For example, there may be a mechanical or electrical interlock between the first and second electrical circuit breakers 30, 34 so that the first electrical circuit breaker 30 cannot open until after the second electrical circuit breaker 34 is closed.

There may be a shut-down mode that occurs when the demand of the compressor 12 is reduced below the speed at operating point A on FIG. 4 so the variable speed drive arrangement 10 may be shut down with some energy recovery. To transition into the shut-down mode the secondary electrical machine 20 is rotating in the reverse direction at its maximum speed. In the shut-down mode the second electrical circuit breaker 34 is opened and then the first electrical circuit breaker 30 is closed once the voltage and frequency of the converter 28 and the power grid 26 are synchronised. Thus when the variable speed drive arrangement 10 is shut down, that is the converter 28 output frequency is zero and no electrical or mechanical power is generated by the primary or the secondary electrical machines 18, 20 the variable speed drive arrangement 10 is inevitably configured to be ready to operate in the starting mode when it is next required.

The shut-down mode may be implemented as a requirement to revert to the starting mode when the compressor speed demand reduces below operating point A on FIG. 4 with the converter 28 acting to reduce its output frequency from its maximum frequency down to zero Hertz. Advantageously using the starting mode with frequency increase or decrease effectively increases the operating range of the variable speed drive arrangement 10 to include the whole of the line 38 shown in FIG. 4.

Figure 5:
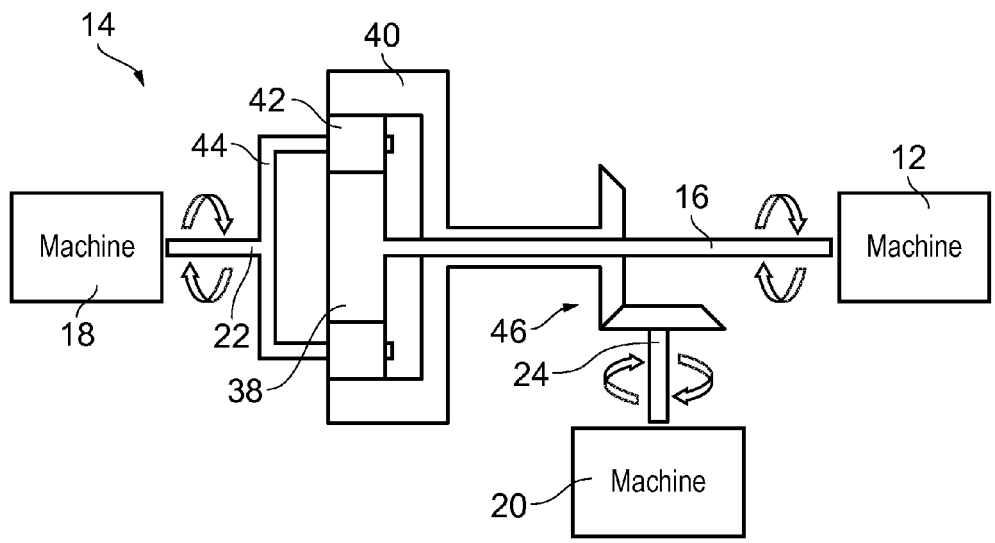
FIG. 5 is a schematic drawing of a gearbox arrangement suitable for use in the compressor drive arrangement of the present invention.

FIG. 5 shows a gearbox 14 that may be used in the variable speed drive arrangement 10. The gearbox 14 illustrated is an epicyclic gearbox which comprises a sun gear 38 and a ring gear 40 which are coaxial. The ring gear 40 surrounds the sun gear 38 and is radially spaced therefrom. In the radial space between the sun gear 38 and the ring gear 40 is an annular array of planet gears 42. Each of the sun gear 38, ring gear 40 and planet gears 42 is toothed so that the planet gears 42 intermesh with the sun gear 38 and the ring gear 40. The planet gears 42 are held in circumferentially spaced relationship by a planet carrier 44 which is coaxial with the sun gear 38 and ring gear 40. Each planet gear 42 is configured to rotate about its own axis, which is parallel to but radially spaced from the common axis of the sun gear 38, ring gear 40 and planet carrier 44. The planet gears 42 can precess about the sun gear 38 as the planet carrier 44 rotates about its axis. The size of the sun gear 38, planet gears 42 and ring gear 40, and the number of planet gears 42 ganged together by the planet carrier 44, determines the gear ratio between the gears.

In some embodiments of the variable speed drive arrangement 10 the compressor 12 is coupled to the sun gear 38 of the gearbox 14 by the mechanical drive shaft 16. The primary electrical machine 18 is mechanically coupled to the planet carrier 44 by the primary mechanical shaft 22. The secondary electrical machine 20 is mechanically coupled to the ring gear 40 by the secondary mechanical shaft 24. Optionally an additional gear 46 may be provided between the secondary electrical machine 20 and the ring gear 40 to set the desired gear ratio between the secondary electrical machine 20 and the compressor 12. Optionally another additional gear (not shown) may be provided between the primary electrical machine 18 and the planet carrier 44 to set the desired gear ratio between the primary electrical machine 18 and the compressor 12.

As will be apparent, the mechanical output of the gearbox 14 is from the sun gear 38. The planet carrier 44 provides the main mechanical input to the gearbox 14, from the primary electrical machine 18. The ring gear 40 may supply or extract mechanical power to the gearbox 14 depending on whether the stator of the secondary electrical machine 20 is excited to rotate the rotor in the forward or reverse directions. When the ring gear 40 is caused to rotate in the same direction as the planet carrier 44 and sun gear 38 the secondary electrical machine 20 supplies mechanical power to the gearbox 14 and thence to the compressor 12. Conversely, when the ring gear 40 is caused to rotate in the opposite direction to the planet carrier 44 and sun gear 38 the secondary electrical machine 20 extracts mechanical power from the gearbox 14 and thus reduces the mechanical power supplied to the compressor 12. The planet gears 42 rotate about their own axes at a speed governed by the difference in rotational speed of the planet carrier 44 and the ring gear 40.

In other embodiments the compressor 12, primary electrical machine 18 and secondary electrical machine 20 may each be coupled to a different one of the sun gear 38, ring gear 40 and planet carrier 44. Alternatively, one of the compressor 12, primary electrical machine 18 and secondary electrical machine 20 may be coupled to a planet gear 42. Each alternative arrangement offers different gear ratios between the primary electrical machine 18, secondary electrical machine 20 and compressor 12 so the most appropriate arrangement for the envisaged application should be chosen by the person skilled in the art.

Figure 6:
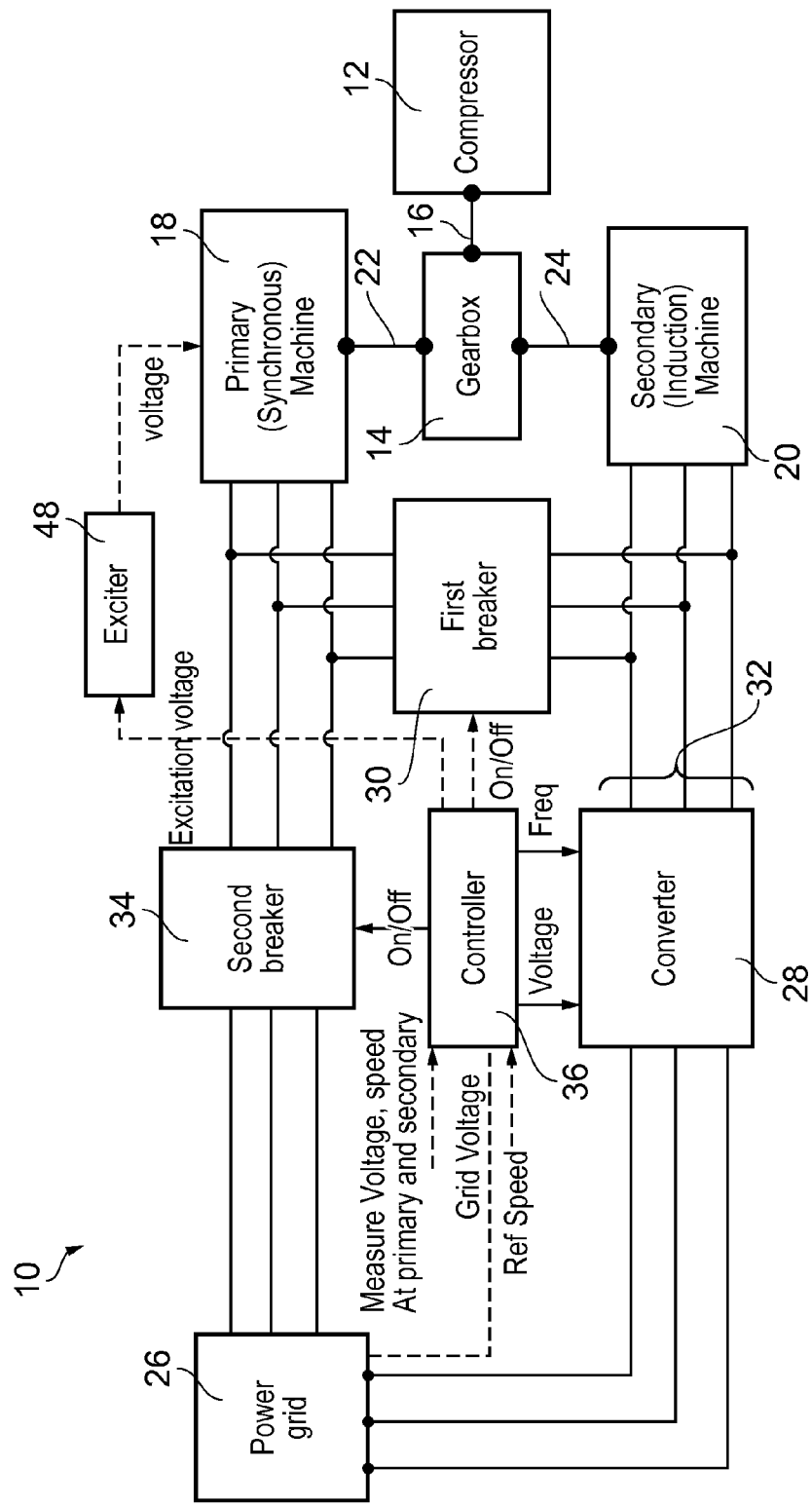
FIG. 6 is a schematic drawing of another compressor drive arrangement according to the present invention.

FIG. 6 shows an embodiment of the variable speed drive arrangement 10 in which the primary electrical machine 18 is a synchronous machine and the secondary electrical machine 20 is an induction machine. A primary exciter 48 is provided to excite the stator of the primary electrical machine 18 in order to accelerate its rotor. The primary exciter 48 may be controlled by the controller 36 or may be a function of the controller 36. Advantageously by providing an induction machine as the secondary electrical machine 20 any dynamic oscillation between the primary and secondary electrical machines 18, 20 is damped.

Figure 7:
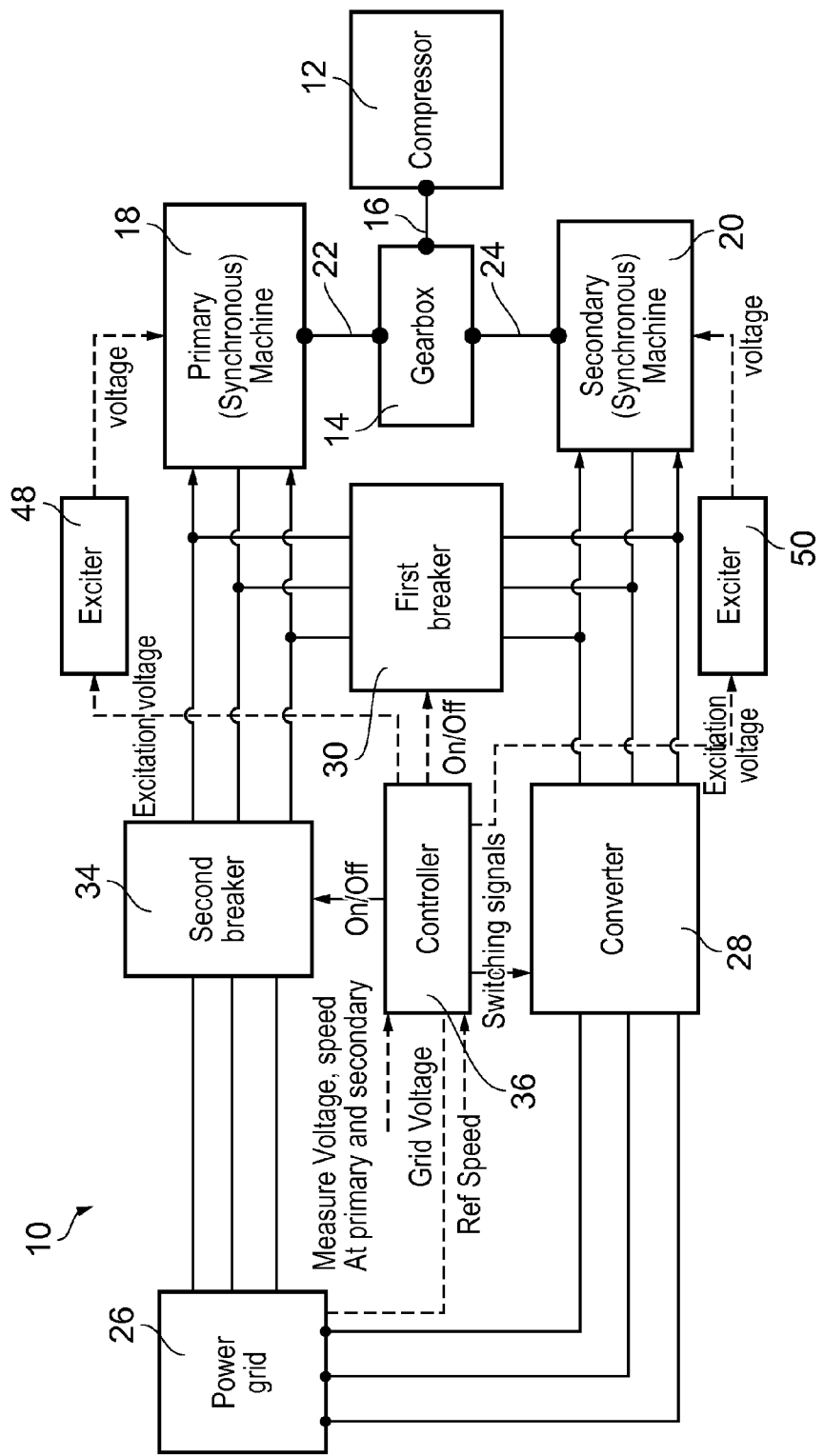
FIG. 7 is a schematic drawing of another compressor drive arrangement according to the present invention.

FIG. 7 shows an embodiment of the variable speed drive arrangement 10 in which the primary electrical machine 18 is a synchronous machine and the secondary electrical machine 20 is also a synchronous machine. The primary exciter 48 is provided to excite the stator of the primary electrical machine 18 in order to accelerate its rotor. The primary exciter 48 may be controlled by the controller 36 or may be a function of the controller 36. A secondary exciter 50 is provided to excite the stator of the secondary electrical machine 20 in order to accelerate its rotor. The secondary exciter 50 may be controlled by the controller 36 or may be a function of the controller 36. Advantageously where both the primary and secondary electrical machines 18, 20 are synchronous machines the variable speed drive arrangement 10 is efficient because synchronous machines are efficient electrical machines. The variable speed drive arrangement 10 overcomes the potential dynamic oscillation between the synchronous primary and secondary electrical machines 18, 20 by starting them simultaneously via the single converter 28.

Figure 8:
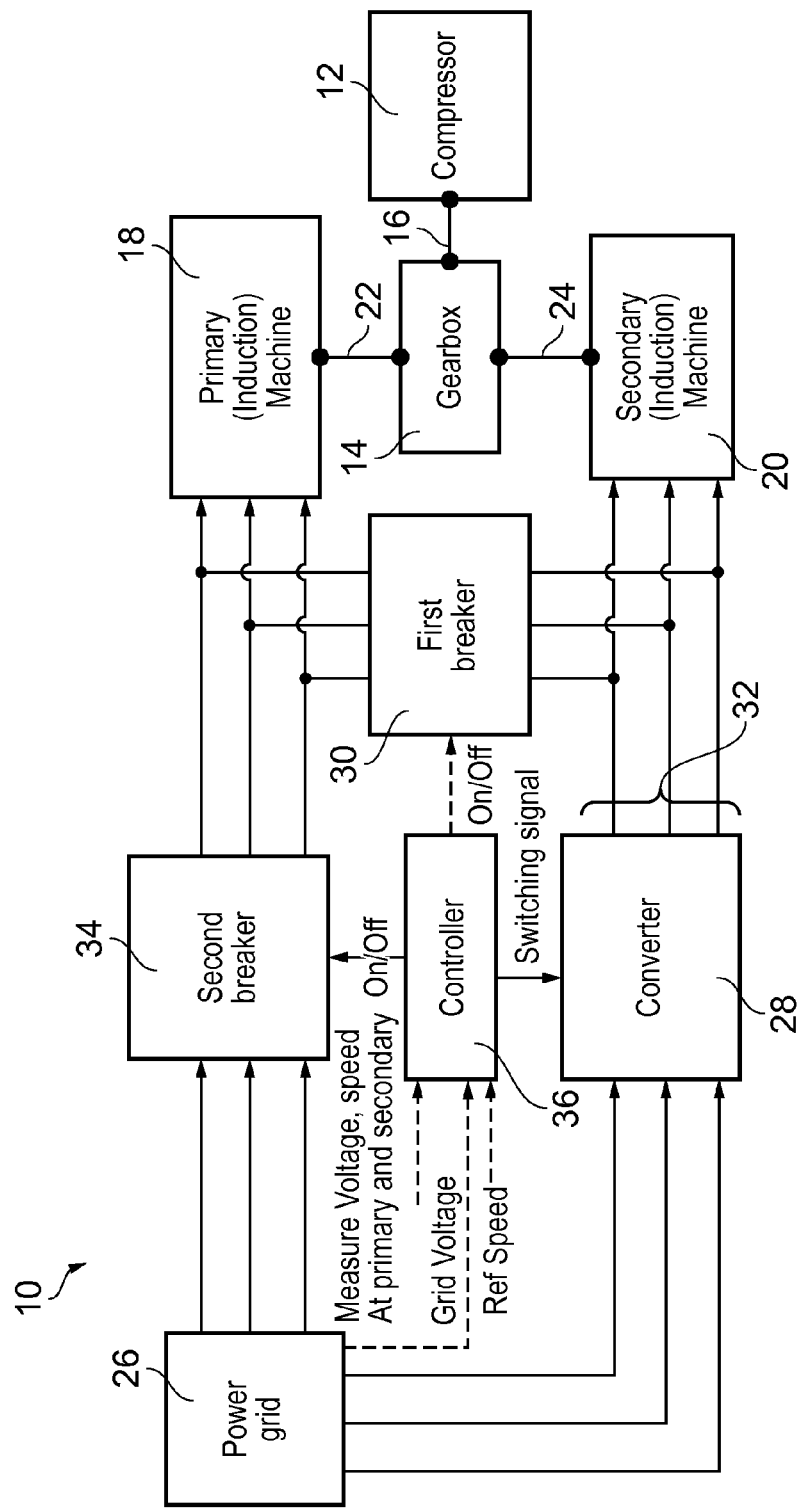
FIG. 8 is a schematic drawing of another compressor drive arrangement according to the present invention.

FIG. 8 shows an embodiment of the variable speed drive arrangement 10 in which the primary electrical machine 18 is an induction machine and the secondary electrical machine 20 is also an induction machine. Advantageously where both the primary and secondary electrical machines 18, 20 are induction machines any potential dynamic oscillation between them is damped. In this embodiment there is no requirement for either the primary exciter 48 or the secondary exciter 50.

Figure 9:
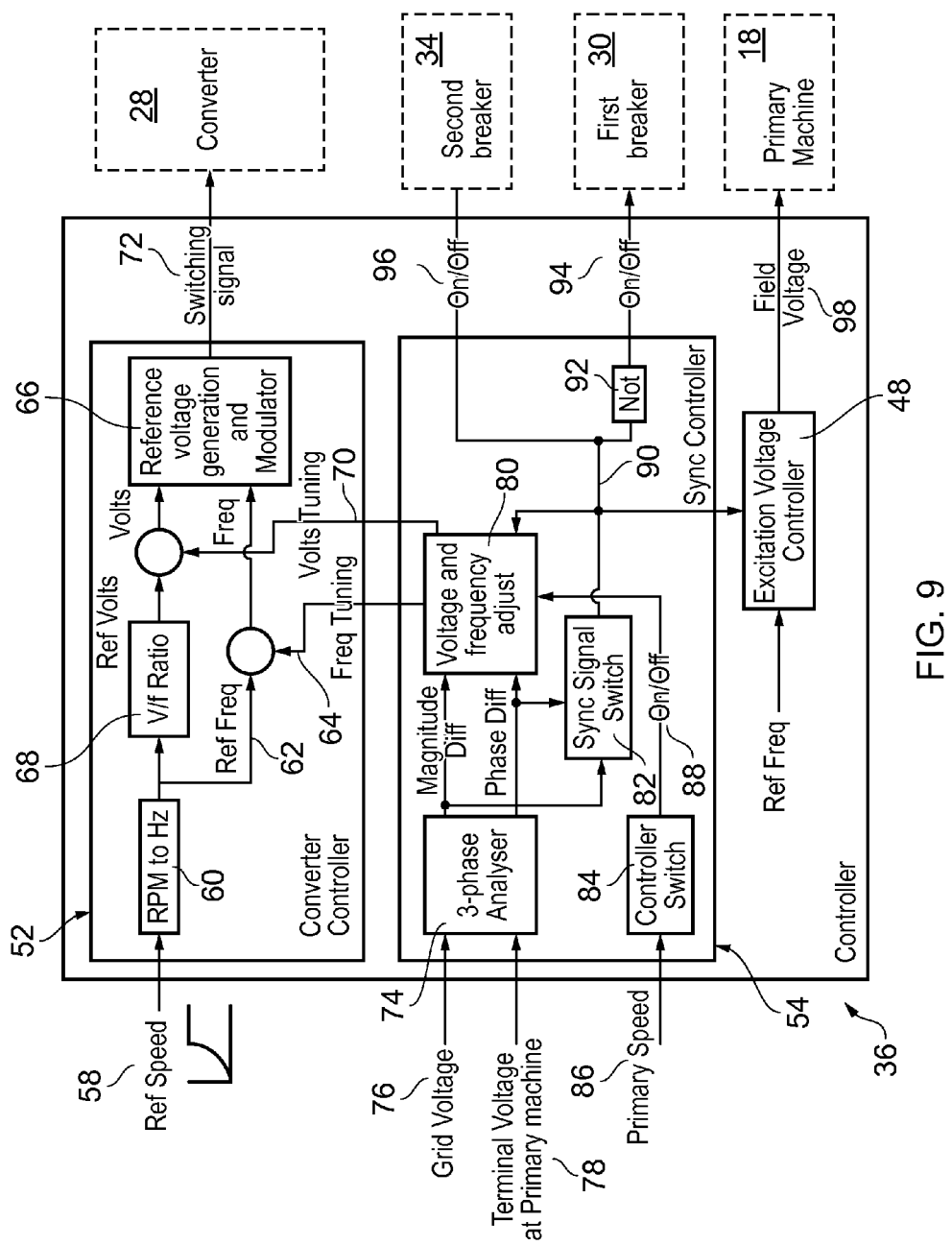
FIG. 9 is a schematic drawing of a controller for use in the present invention.

An exemplary arrangement of the optional controller 36 is shown in FIG. 9. The controller 36 comprises two functional blocks, a converter controller 52 and a synchronisation controller 54. Where the primary electrical machine 18 is a synchronous machine the controller 36 also includes the primary exciter 48.

The converter controller 52 part of the controller 36 receives a reference speed 58 a supervisory controller. Preferably the reference speed 58 is a smoothly changing value to prevent large current being drawn by the converter 28. The reference speed 58 is converted into a frequency in Hertz as shown in box 60. On branch 62 the frequency is adjusted by a frequency tuning signal 64 generated by the synchronisation controller 54, as will be described below. The adjusted frequency is supplied to a voltage generator 66. The frequency calculated in box 60 is also passed through a gain 68 comprising a voltage to frequency ratio. From this a reference voltage is determined which is adjusted by a voltage tuning signal 70 generated by the synchronisation controller 54, as will be described below. The adjusted voltage is supplied to the voltage generator 66. The voltage generator 66 calculates the required output signal 72 that is passed to the converter 28. The output signal 72 defines the required output voltage and frequency for the converter 28 and the required phase connection between the converter 28 and the secondary electrical machine 20 to cause the rotor to rotate in the forward or reverse direction.

The synchronisation controller 54 part of the controller 36 controls the opening and closing of the first electrical circuit breaker 30 and the second electrical circuit breaker 34. A three-phase analyser 74 receives inputs of grid voltage 76, that is the voltage of the power grid 26, and primary machine voltage 78, that is the voltage at the primary electrical machine 18. The three-phase analyser 74 calculates the difference in magnitude and the difference in phase of the grid voltage 76 and primary machine voltage 78. These differences are passed to a tuning function 80 and to a synchronisation switch 82. A controller switch 84 receives an input comprising the rotational speed 86 of the primary electrical machine 18. The controller switch 84 generates an on/off signal 88 when the speed of the primary electrical machine 18 is close to its synchronous speed in order that voltage and frequency synchronisation can be implemented. The on/off signal 88 is passed to the tuning function 80. The synchronisation switch 82 determines when the differences in phase and magnitude of the grid voltage 76 and primary machine voltage 78 are small enough for smooth connection and generates a signal to stop the adjustment. This signal is passed to the tuning function 80, branch 90 and to the primary exciter 48.

The tuning function 80 is activated by the on/off signal 88; if this is set to 'off' the output from the tuning function 80 remains at its previous values. If the on/off signal 88 is set to 'on' the tuning function 80 employs a proportional or proportional integral controller to calculate the frequency tuning signal 64 to increase or decrease the frequency and thus adjust the phase difference towards zero. Similarly, the tuning function 80 employs a proportional or proportional integral controller to calculate the voltage tuning signal 70 to increase or decrease the frequency and thus adjust the voltage difference towards zero.

On branch 90 the output of the synchronisation switch 82 is supplied to a logical NOT gate 92 to invert it. The NOT gate 92 outputs an on/off signal 94 to close or open the first electrical circuit breaker 30 to permit or prevent current flow therethrough. Optionally on branch 90 the output of the synchronisation switch 82 is also supplied to the second electrical circuit breaker 34, if it is used, as an on/off signal 96 to open or close the second electrical circuit breaker 34 to prevent or permit current flow therethrough.

The primary exciter 48 also receives the reference frequency, from the box 60 or independently calculated, and determines the field voltage 98 which is passed to the primary electrical machine 18.

Figure 10:
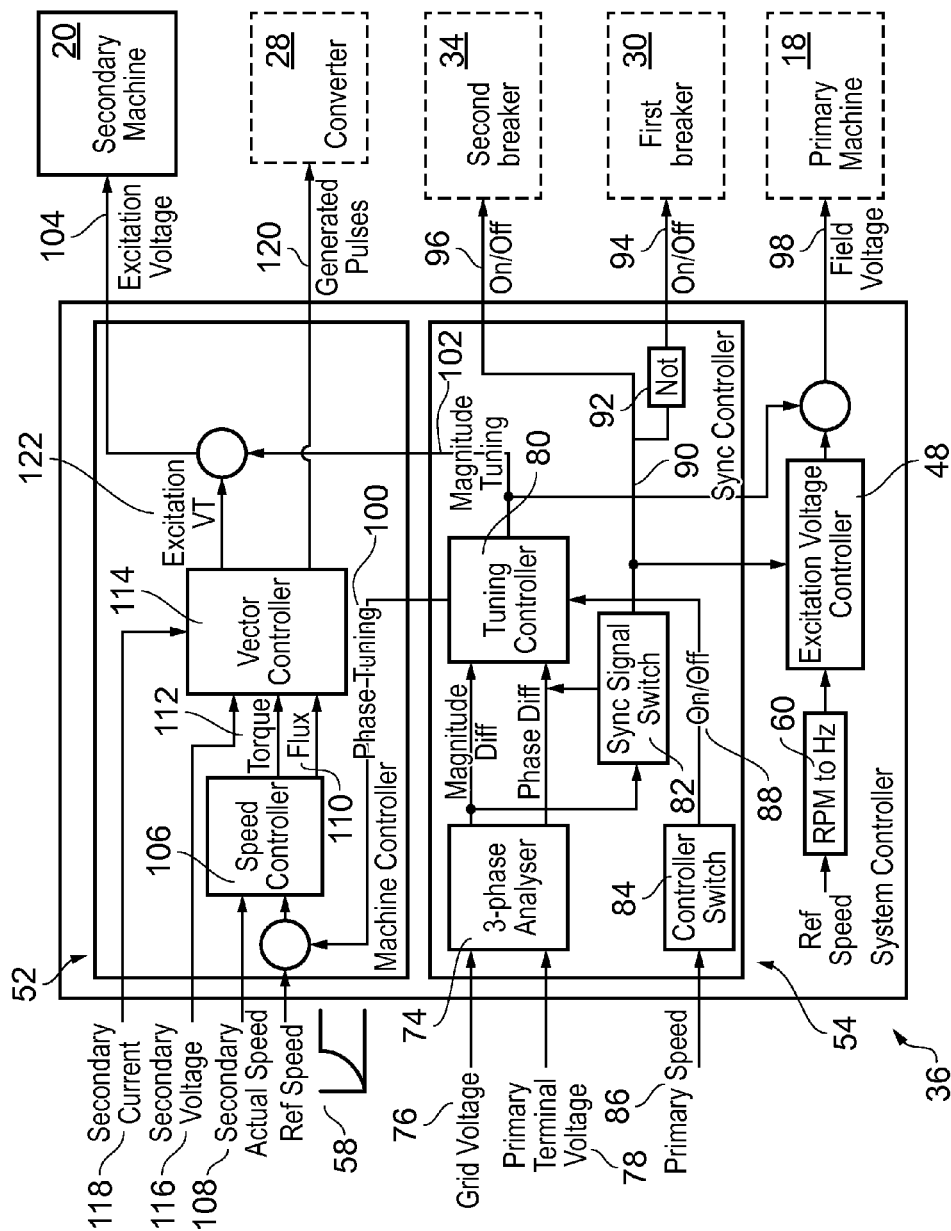
FIG. 10 is a schematic drawing of another controller for use in the present invention.

An alternative exemplary arrangement of the optional controller 36 is shown in FIG. 10 which is suitable for use in the variable speed drive arrangement 10 where both the primary and secondary electrical machines 18, 20 are synchronous machines. The synchronisation controller 54 and primary exciter 48 are substantially as described with respect to FIG. 9 but the converter controller 52 differs as will be described. The tuning controller 80 is arranged to output a phase tuning signal 100 and a magnitude tuning signal 102 which are each passed to the converter controller 52. The converter controller 52 also outputs an excitation voltage 104 that is passed to the secondary electrical machine 20 to control the secondary exciter 50.

The phase tuning signal 100 is added to the reference speed 58 and the result is passed to a speed controller 106. The speed controller 106 receives a second input, the rotational speed 108 of the secondary electrical machine 20. The speed controller 106 outputs flux demand 110 and torque demand 112. The torque demand 112 is the braking or accelerating torque required to reduce the speed difference to zero. The flux demand 110 is summed with the magnitude tuning signal 102 and the result is passed to a vector controller 114. The torque demand 112 is also passed to the vector controller 114. The vector controller 114 also receives inputs from the secondary electrical machine 20 comprising the voltage 116 and current 118 of its stator. The vector controller 114 combines the four inputs, adjusted flux demand, torque demand 112, secondary voltage 116 and secondary current 118 to output the excitation voltage 104 and generated pulses 120. The excitation voltage 104 defines the flux level in the secondary electrical machine 20. The generated pulses 120 are passed to the converter 28 to control its output frequency and its phase connection to the secondary electrical machine 20.

Figure 11:
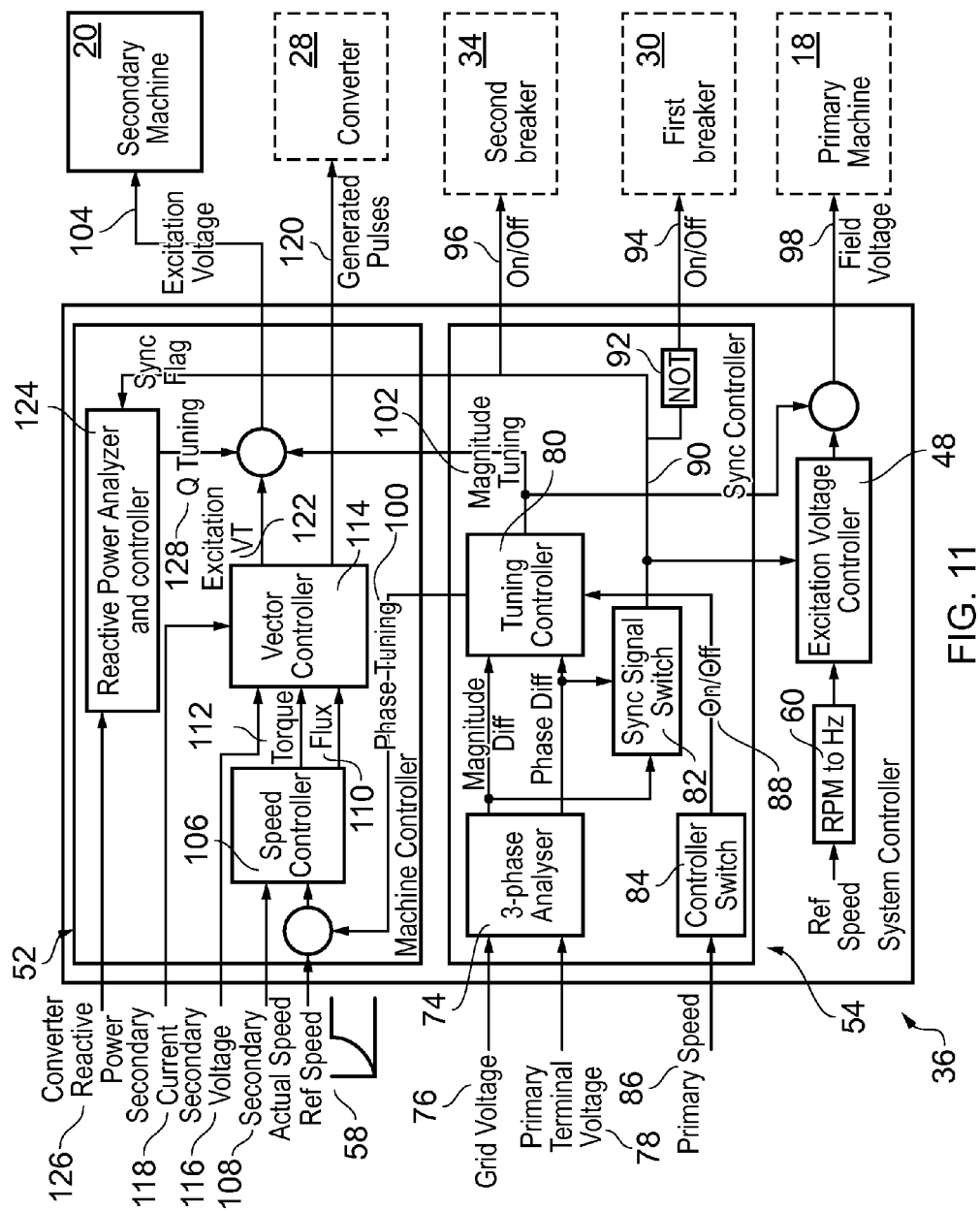
FIG. 11 is a schematic drawing of another controller for use in the present invention.

FIG. 11 shows another alternative exemplary arrangement of the optional controller 36 which is suitable for use in the variable speed drive arrangement 10 where both the primary and secondary electrical machines 18, 20 are synchronous machines. It differs from FIG. 10 in that the flux 110 is passed directly to the vector controller 114. The vector controller 114 outputs a field excitation voltage 122 which is summed with the magnitude tuning signal 102 to give the excitation voltage 104 which is passed to the secondary electrical machine 20. The magnitude tuning signal 102 is also summed with the output of the primary exciter 48 to give the field voltage 98 that is passed to the primary electrical machine 18. Advantageously this arrangement of the optional controller 36 is arranged to optimally control the reactive power circulation and therefore to reduce the reactive power taken from the converter 28. Hence the converter 28 can be smaller than in known arrangements.

Figure 12:
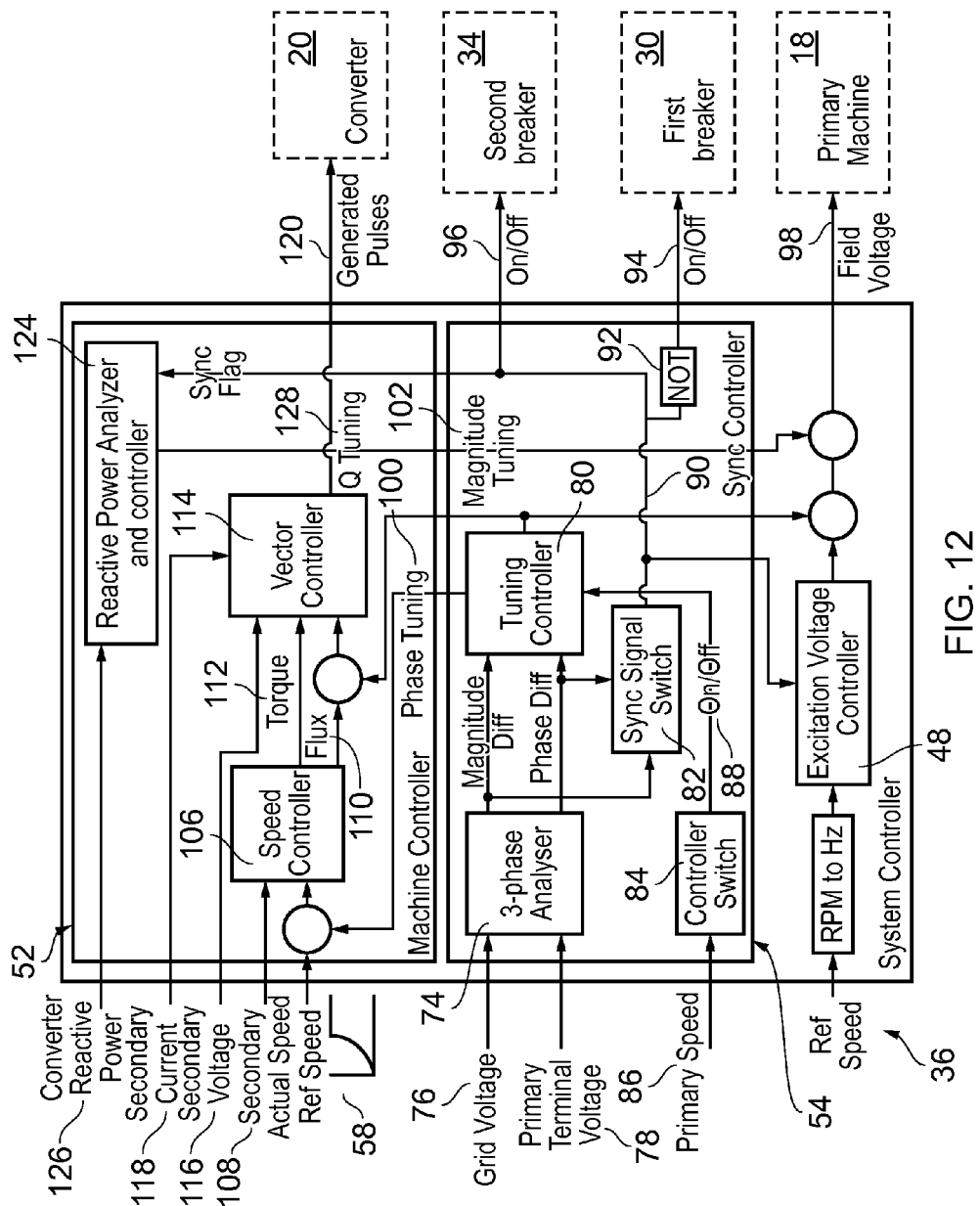
FIG. 12 is a schematic drawing of another controller for use in the present invention.

FIG. 12 shows another alternative exemplary arrangement of the optional controller 36 which is suitable for use in the variable speed drive arrangement 10 where both the primary and secondary electrical machines 18, 20 are synchronous machines. It differs from FIG. 11 in that the converter controller 52 also includes a reactive power controller 124 which receives an input comprising the converter reactive power 126. The converter reactive power 126 is derived from the output voltage of the converter 28. The reactive power controller 124 generates a reactive power tuning signal 128. This is summed with the excitation Vf 122 and the magnitude tuning signal 102 to give the excitation voltage 104 which is passed to the secondary electrical machine 20. The reactive power controller 124 also receives the output from the synchronisation switch 82 which stops the tuning when the reactive power is synchronised.

Advantageously this arrangement of the controller 36 minimises the requirement of the converter 28 to generate or consume reactive power. Consequently the size of the converter 28 can be minimised.

Figure 13:
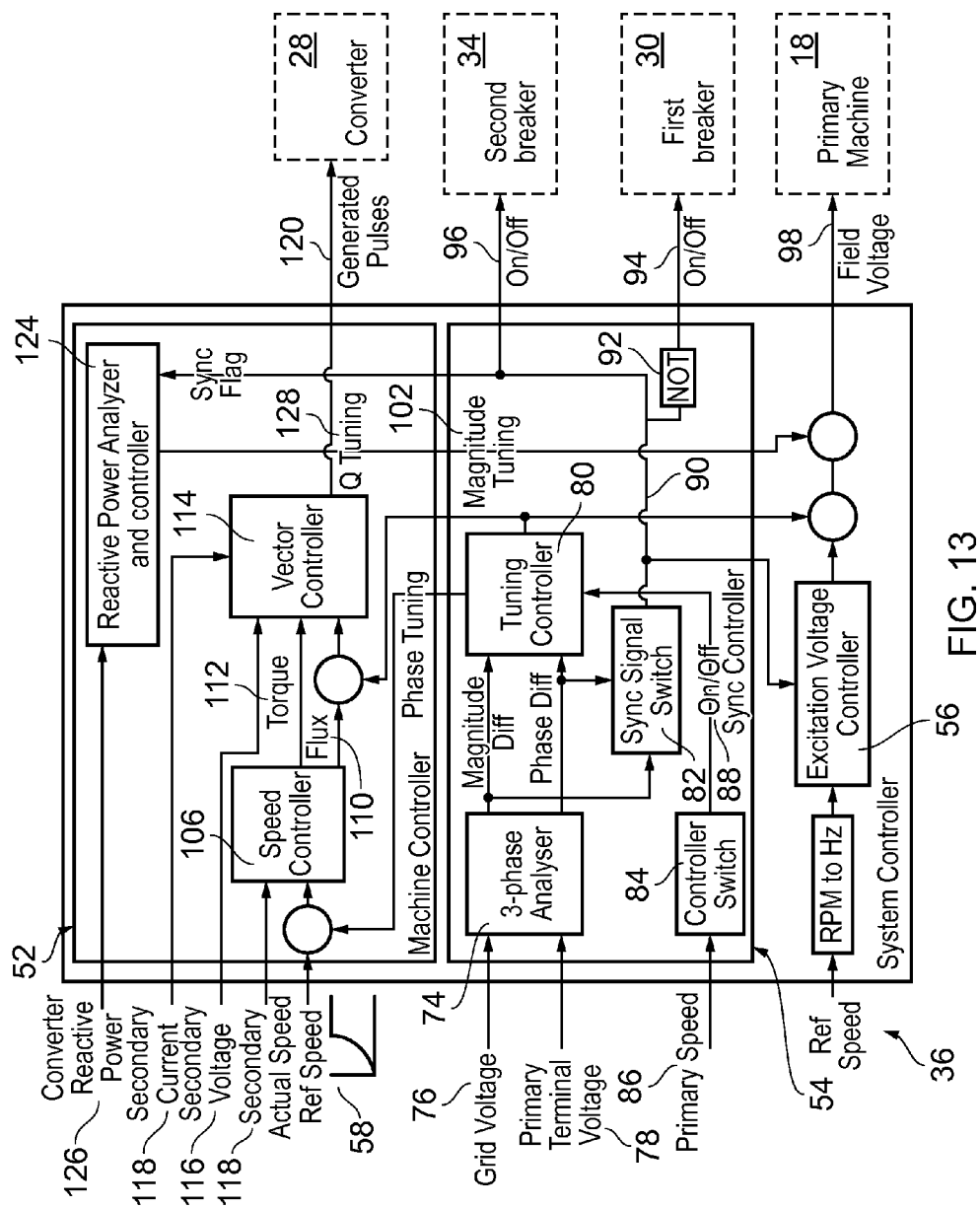
FIG. 13 is a schematic drawing of another controller for use in the present invention.

FIG. 13 shows another alternative exemplary arrangement of the optional controller 36 which is suitable for use in the variable speed drive arrangement 10 where the primary electrical machine 18 is a synchronous machine and the secondary electrical machine 20 is an induction machine. Thus the vector controller 114 does not generate the excitation voltage 104 because the secondary electrical machine 20 does not require it. FIG. 13 combines elements from FIG. 10 and FIG. 12. Specifically the magnitude tuning signal 102 is summed with the flux 110 and provided as an input to the vector controller 114 as described with respect to FIG. 10. The magnitude tuning signal 102 is also summed with the output of the primary exciter 48. However, the result is then summed with the reactive power tuning signal 128 generated by the reactive power controller 124 to give the field voltage 98 which is provided to the primary electrical machine 18.

Advantageously this arrangement of the controller 36 minimises the requirement of the converter 28 to generate or consume reactive power. Consequently the size of the converter 28 can be minimised.

FIG. 13 shows another alternative exemplary arrangement of the optional controller 36 which is suitable for use in the variable speed drive arrangement 10 where the primary electrical machine 18 is an induction machine and the secondary electrical machine 20 is a synchronous machine. It is akin to FIG. 12 but omits the primary exciter 48, its input and output because the primary electrical machine 18 does not require field voltage 98.

Advantageously this arrangement of the controller 36 controls the secondary excitation to generate the reactive power required by the primary electrical machine 18. Consequently the reactive power drawn from the converter 28 is minimised and so the converter 28 size is also minimised.

Figure 14:
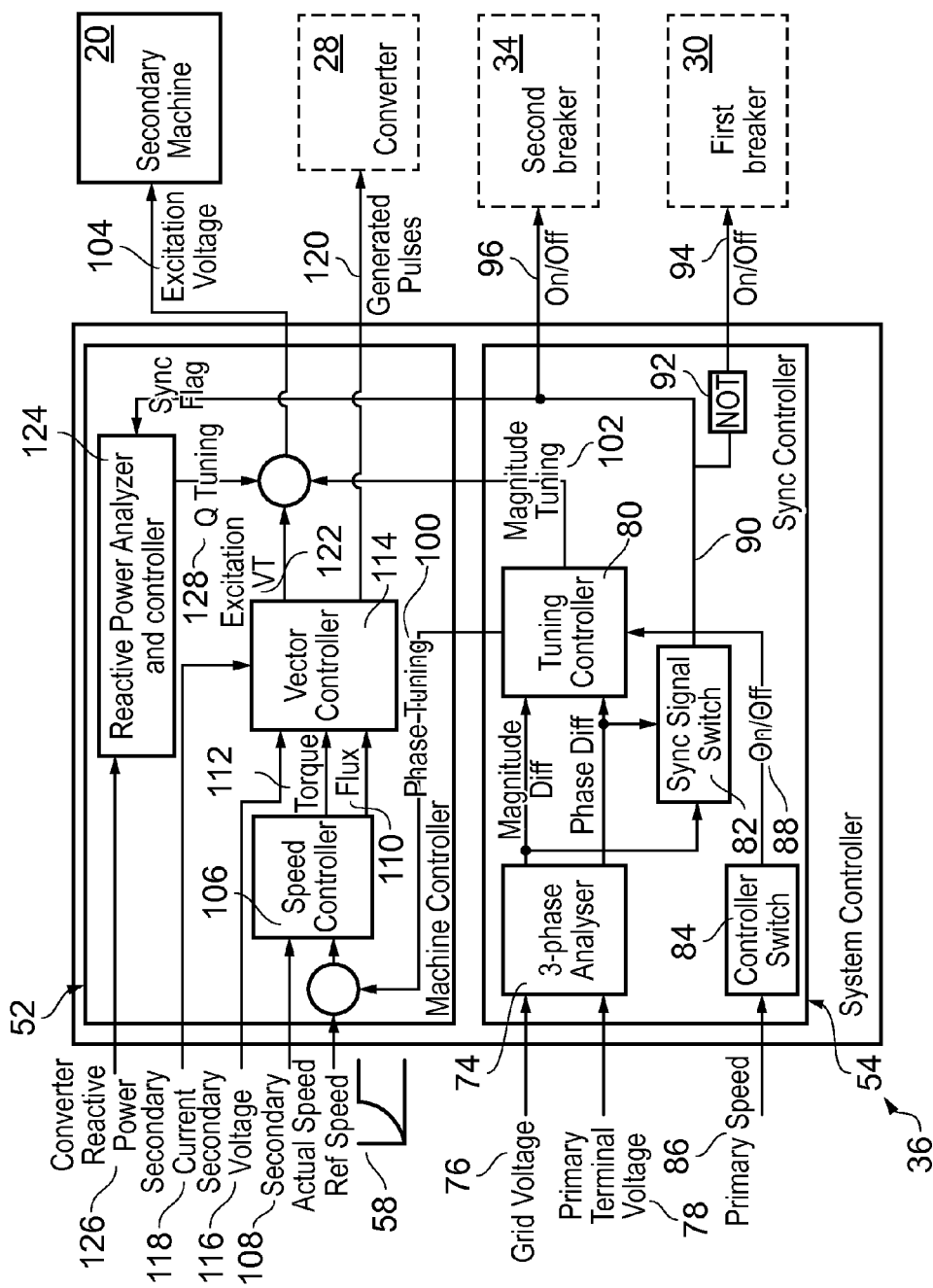
FIG. 14 is a schematic drawing of another controller for use in the present invention.

Advantageously the size of the converter 28 may be reduced further if control algorithms to manage reactive power as shown in FIG. 12, FIG. 13 or FIG. 14 are used.

An advantage of the variable speed drive arrangement 10 of the present invention is that only one converter 28 is required, which acts to start the primary electrical machine 18 as well as the secondary electrical machine 20. In known arrangements a second converter is required, sized to accelerate the primary electrical machine 18 from stationary to its maximum speed. Since the primary electrical machine 18 is significantly larger than the secondary electrical machine 20 such a converter is necessary large, both in terms of its power output and its physical size. Converters are generally expensive and may be less reliable than other components of the variable speed drive arrangement 10. Therefore it is advantageous that the present invention requires only one, small converter 28 because the arrangement 10 is therefore cheaper and more reliable than known arrangements.

Although a three-phase analyser 74 has been described in the controller 36, where three-phase electricity is not used the analyser 74 will be modified to analyse the same number of phases as are present in the electricity.

Where the primary electrical machine 18 is an induction machine the primary exciter 48 is omitted from the controller 36. Conversely, where the secondary electrical machine 20 is a synchronous machine excitation is provided from the voltage controller 114.

It is possible to revert to the starting mode after the variable speed drive arrangement 10 has been in the running mode, for example if the desired power output of the compressor 12 falls below the minimum for the running mode as given at operating point A of FIG. 4. It is preferable to synchronise the voltage of the converter 28 with the power grid 26 before closing the first electrical circuit breaker 30 to couple the primary electrical machine 18 with the converter 28 and secondary electrical machine 20, and to open the second electrical circuit breaker 34 to break the electrical couple between the primary electrical machine 18 and the power grid 26.

Advantageously, because the primary electrical machine 18 is not connected to the power grid 26 until it has been accelerated to its fixed, synchronous speed, no large inrush current is drawn from the power grid 26 during starting.

Although a converter 28 rated for approximately 20% of the full power demand of the compressor 12 has been described, in other applications of the variable speed drive arrangement 10 of the present invention the converter 28 may be rated for up to 50% of the full power demand of the compressor 12.

Although a compressor 12, for example a gas compressor, has been described herein the arrangement 10 may instead drive another load in a rotating system. The variable speed drive arrangement 10 is particularly advantageous in applications where the required power at low speed is lower than the corresponding reduction in speed. In such applications the load power may have a squared or cubed relationship with the speed. Such applications include ship or aircraft propulsion, pumps, propellers, industrial fans or pumps, air conditioning pumps and compressors, and trains or road vehicles. The variable speed drive arrangement 10 finds application in a hybrid shaft generator for marine power. In this application the compressor 12 is replaced by the ship's propeller.

Although an epicyclic gearbox 14 has been described an alternative gearbox arrangement may be used. For example a Revigneaux gearbox, double epicyclic in star format, may be used. Other gearbox arrangements to provide the necessary differential action may also be used.

The variable speed drive arrangement 10 has been described having primary and secondary electrical machines 18, 20. However one or more additional electrical machines may be provided in the variable speed drive arrangement 10. Each additional electrical machine would be configured as a primary or secondary electrical machine 18, 20, that is to operate at fixed speed or variable speed. Each additional electrical machine would therefore be mechanically coupled with the primary electrical machine 18 or the secondary electrical machine 20 in parallel, on separate shafts, or in series, on the same shaft.

Although the primary and secondary electrical machines 18, 20 have been described as synchronous or induction machines other types of electrical machine are contemplated within the scope of the claimed invention. For example, either or both of the electrical machines 18, 20 or any additional electrical machines may be permanent magnet synchronous machines or switched reluctance machines.

The controller 36, particularly the converter controller 52 part, may be open loop or closed loop controlled. Control methods including model predictive control, multivariable control, adaptive control, nested loop control, proportional plus resonance control, direct torque and flux control may be used. The controller 36 may take factors such as hysteresis into account.

The converter 28 may include any suitable power electronic components. For example it may include some or all of IGBTs, thyristors, MOSFETs and IGCTs. The converter 28 may be a multilevel inverter, particularly for medium voltage applications in the range 3.3 kV to 11 kV. The converter 28 may be configured as a low voltage converter and a step-up transformer. The converter 28 may be configured as a back-to-back connected active converter; a bidirectional converter with a diode rectifier and active rectifier at its front end; or as a unidirectional converter with a diode rectifier at its front end (the end coupled to the power grid 26) and energy storage to receive power fed back towards the converter 28; or as a unidirectional converter 28 with a diode rectifier at its front end and a resistor bank to receive power fed back towards the converter 28, the resistor bank controlled by another converter or by an active switch.

Advantageously the converter 28 and circuit breakers 30, 34 can be relatively small because they need not be sized for large inrush currents. The variable speed drive arrangement 10 also provides economic benefits because it is smaller and has lower operating costs. Furthermore, there is no requirement for bespoke components for the variable speed drive arrangement 10 and therefore the components are cheaper.

The invention claimed is:

1. A variable speed drive arrangement comprising:
   a load;
   a gearbox to supply mechanical drive to the load;
   a converter electrically coupled with a power grid;
   a primary electrical machine to supply mechanical power to the gearbox and to receive electrical power;
   a secondary electrical machine mechanically coupled to the gearbox and electrically coupled to the converter; and
   a first electrical circuit breaker to selectively electrically couple the primary electrical machine to the secondary electrical machine or to the power grid;
   wherein the secondary electrical machine is adapted to supply or extract mechanical power from the gearbox and to receive or deliver electrical power to the converter.

2. An arrangement as claimed in claim 1 wherein the load is a compressor.

3. An arrangement as claimed in claim 1 wherein the primary electrical machine is a fixed speed electrical machine or a variable speed electrical machine.

4. An arrangement as claimed in claim 1 wherein the primary electrical machine is a synchronous machine or an induction machine.

5. An arrangement as claimed in claim 1 wherein the secondary electrical machine is a variable speed electrical machine or an induction machine or a synchronous machine.

6. An arrangement as claimed in claim 1 wherein the gearbox is an epicyclic gearbox.

7. An arrangement as claimed in claim 1 further comprising a second electrical circuit breaker between the primary electrical machine and the power grid.

8. An arrangement as claimed in claim 1 further comprising a controller and wherein the controller is arranged to schedule output frequency from the converter in the range zero Hertz to maximum frequency.

9. An arrangement as claimed in claim 1 wherein the controller is arranged to schedule switching of the first electrical circuit breaker and, further comprising a second electrical circuit breaker between the primary electrical machine and the power grid, to schedule switching of the second electrical circuit breaker.

10. An arrangement as claimed in claim 1 wherein the controller is arranged to switch phase connections to the secondary electrical machine to effect control of the direction of rotation of the secondary electrical machine.

11. An arrangement as claimed in claim 1 wherein the secondary electrical machine is smaller than the primary electrical machine.

12. An arrangement as claimed in claim 1 wherein the converter is sized for up to 20% of the output power demand of the load.

13. An arrangement as claimed in claim 1 further comprising an additional gear between the secondary electrical machine and the gearbox.

14. An arrangement as claimed in claim 1 wherein the power grid comprises a national grid or a local grid; wherein the local grid comprises any combination of: one or more electrical machines, one or more gas turbine engines, one or more other power sources.

15. A control method for the arrangement according to claim 1, the method comprising:

in a starting mode, increasing the output frequency of the converter up to a maximum to accelerate the primary electrical machine up to its fixed speed and to accelerate the secondary electrical machine up to its maximum speed in the opposite rotational sense to the primary electrical machine; and in a running mode, controlling the speed of the secondary electrical machine between maximum forward speed and maximum reverse speed to modulate the mechanical output of the gearbox and thus the load output speed.

16. A control method as claimed in claim 15 further comprising:

in a shut-down mode, closing the first electrical circuit breaker and coupling the converter to the secondary electrical machine such that it will accelerate in the opposite rotational sense to the primary electrical machine.

17. A control method as claimed in claim 16 when the arrangement comprises a second electrical circuit breaker between the primary electrical machine and the power grid further comprising:

in the shut-down mode, opening the second electrical circuit breaker to break the couple between the primary electrical machine and the power grid.

18. A control method as claimed in claim 15 further comprising:

in a transition mode, switching the first electrical circuit breaker to break the couple between the primary and secondary electrical machines and to make the couple between the primary electrical machine and the power grid.

19. A control method as claimed in claim 15 wherein in the starting mode the secondary electrical machine is directly coupled to the primary electrical machine.

20. A control method as claimed in claim 15 wherein in the running mode the secondary electrical machine is coupled to the power grid and wherein in the running mode the secondary electrical machine is run forwards or backwards to modulate the mechanical output of the gearbox.

* * * * *